United States Patent [19]

Waldron

[11] 4,039,745
[45] Aug. 2, 1977

[54] SPLICES FOR HIGH PRESSURE PIPE-TYPE CABLES

[75] Inventor: Richard C. Waldron, Mountain Lakes, N.J.

[73] Assignee: The Okonite Company, Ramsey, N.J.

[21] Appl. No.: 649,600

[22] Filed: Jan. 16, 1976

[51] Int. Cl.² .......................................... H02G 15/24
[52] U.S. Cl. ............................ 174/21 R; 174/88 R
[58] Field of Search .................... 174/21 R, 88 R, 27, 174/15 C

[56] References Cited

U.S. PATENT DOCUMENTS

| 3,187,088 | 6/1965 | Warner | 174/88 R X |
| 3,447,986 | 6/1969 | Kasahara | 174/21 R X |
| 3,553,342 | 1/1971 | Papadopulos | 174/21 R |
| 3,828,114 | 8/1974 | Priaroggia et al. | 174/21 R X |

Primary Examiner—Arthur T. Grimley
Attorney, Agent, or Firm—Stephen B. Judlowe; James M. Rhodes, Jr.

[57] ABSTRACT

An improved sleeve arrangement is herein provided for protecting splices in pipe-type cables. The sleeve is formed with a diameter which is slightly larger than the overall diameter of the spliced cables and is tapered at the ends to correspond to the tapering of the spliced cables.

The sleeve may be made in two halves and the end flanges thereof bolted and gasketed. Alternatively, the sleeve may be welded. In one form of the invention, a cage like support is provided within a main casing having a diameter somewhat larger than the diameter of the spliced cables and tapering at the ends thereof to properly support a splice and at the same time to permit free longitudinal movement. The cage may comprise a series of metal strips welded at each end to a flange which may be bolted to the end flange to which the outer casing is welded.

3 Claims, 8 Drawing Figures

SPLICES FOR HIGH PRESSURE PIPE-TYPE CABLES

BACKGROUND OF THE INVENTION

The present invention relates to an improvement in splicing arrangements for pipe-type cables and, more specifically, relates to a sleeve arrangement which is designed to permit freedom of longitudinal cable movements within the joint casing while supporting the cables against bending within the joint casing.

The currently used arrangement for supporting spliced cables within a joint casing involves the support of the cables at intervals along the length thereof with members generally referred to as spiders. The spiders are bound to the spliced cables which generally comprise three cables and are sized to radially space the cables to center the cables within the joint casing.

The spiders are attached to the cables so that, if there is any longitudinal movement of the splice, the spiders slide along the inside of the joint casing. This situation is generally acceptable for small movements of the splices, but if there is any appreciable movement of the splices, as can occur on a grade where the cables tend to slide down hill, the movement may be great enough to result in the end spider moving to the terminal end of the casing. This extreme situation then prevents further movement of the cable and, due to the fact that the spiders are bound to the cables, damage to the cable insulation can occur resulting in electrical failure.

Because of the degree of potential cable movement within the casing, which movement is frequently encountered in the field, it is not possible to leave sufficient distance from the original position of the spider to the end of the joint casing to accommodate all possible movement. If too much distance is permitted between the original position of the spider and the end of the joint casing, the unsupported cable may sag resulting in severe bending and the cable may be damaged at the entrance to the main pipe.

OBJECT AND SUMMARY OF THE INVENTION

It is therefore an object of the present invention to provide a spliced joint casing arrangement which eliminates the need for using support spiders and thus prevents damage to the spliced cables during the movement thereof. The arrangement according to the present invention is uniquely simple and economical to manufacture. Other objects of the invention will be apparent upon a reading of the following specification.

At least some of the objects of the present invention are achieved by the provision of a spliced cable enclosure having a diameter only slightly larger than the overall diameter of the spliced cables and gradually tapered to the smaller diameter of the main cable pipe.

THE DRAWINGS

While the invention is particularly pointed out and distinctly claimed in a concluding portion of the specification, a preferred embodiment is set forth in the following detailed description wich may be best understood when read in connection with the accompanying drawings in which:

DETAILED DESCRIPTION OF THE DRAWINGS

Figure 1:
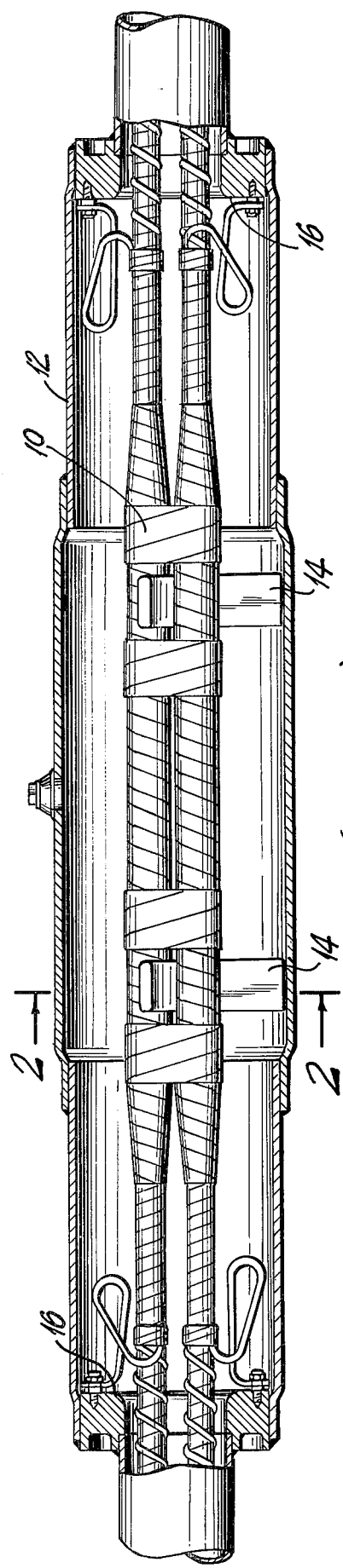
FIG. 1 is an axially cross-sectional view of a prior art casing for a cable splice.
Figure 2:
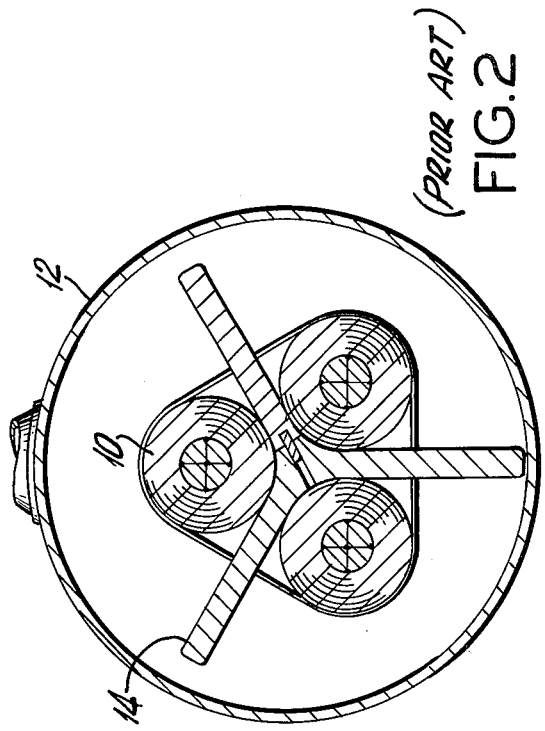
FIG. 2 is a radial cross-sectional view of the prior art arrangement of FIG. 1 taken along line 2—2.

Referring now to the drawings in which like numerals are used to indicate like parts throughout the various views thereof, FIGS. 1 and 2 show the existing, prior art arrangement of a joint casing for protecting a splice in a high pressure pipe-type cable.

As can be seen, the present practice is to support the spliced cable 10 generally co-axially within the protective joint casing 12 by means of spiders 14. The spiders 14 are bound to the cable and are of such a radially extension as to center the cables by bearing radially against the inside of the joint casing 12.

As discussed in detail in the background of the invention, the spiders and the supported cable slide longitudinally within the joint casing in response to the movement of the splice. When the spider reaches the terminal end 16 of the joint casing 12, the spider can no longer slide and, since the spider is bound to the cable, the insulation may be damaged and electrical failure may result.

One known attempt in solving this problem has been to place a rigid tube over each individual cable to stiffen the cable. This attempted solution required the tubes and cable to be bound to a spider with the possibility of damage to the insulation as was the case with the original prior art arrangement. However, such an arrangement further introduces the problem of creating a barrier to the free flow of fluid around the cables which lack of fluid may result in a hot spot when the cables are fully loaded.

Figure 3:
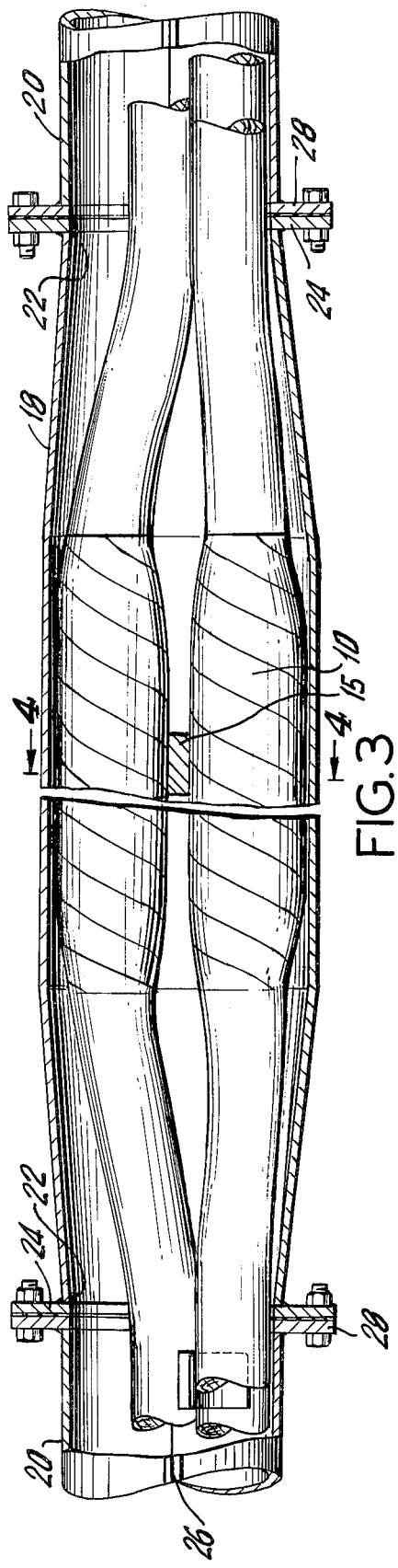
FIG. 3 is a partial cut away view of one embodiment of the present invention.
Figure 5:
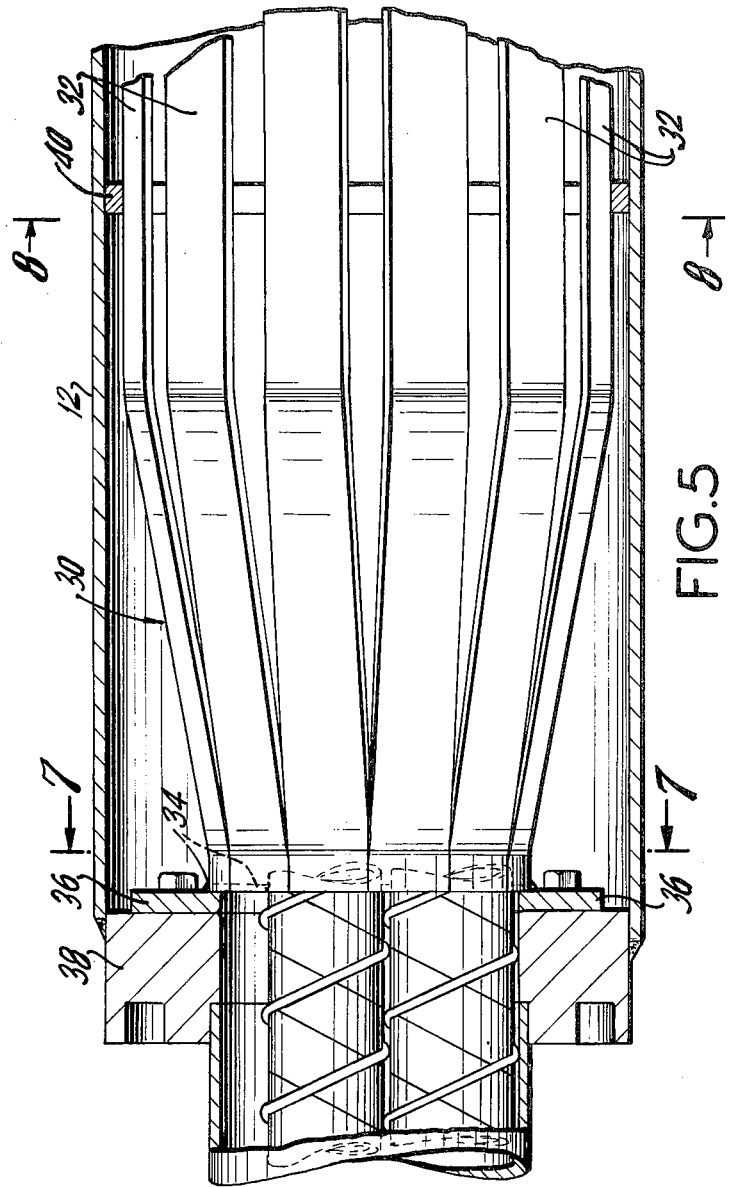
FIG. 5 is a cut away view of another embodiment of the present invention.
Figure 4:
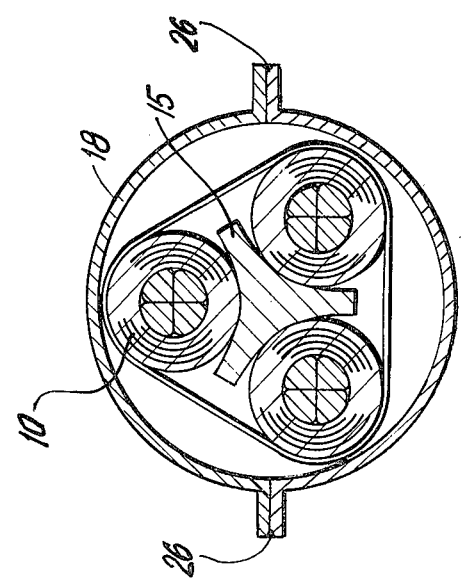
FIG. 4 is a radial cross-sectional view of the embodiment shown in FIG. 3 taken along line 4—4.

Referring now to FIGS. 3 and 4, one embodiment of the present invention is shown wherein support spiders are eliminated and, accordingly, the problem of damage to the cables during the longitudinal movement thereof is obviated. As can be seen in FIG. 3, the diameter of the joint sleeve 18 is only slightly larger than the diameter of the main pipe 20. Typically, a sleeve 18 diameter of approximately 2.16 times the diametral thickness of the spliced cables is preferred. The sleeve 18 is tapered toward the axial ends thereof to generally correspond with the tapering of the spliced cables. As can be further seen in FIG. 3, the diameter of the joint sleeve reduces at its terminal end 22 to the diameter of the main pipe 20.

Preferably, the joint sleeve of the present invention may be made into longitudinal halves defining end flanges 24 at the terminal ends thereof. The longitudinal halves may then be welded as indicated at 26 in FIG. 4 and the flanges bolted and gasketed to flanges 28 in the main pipe as indicated in FIG. 3.

Through the last mentioned arrangement, the diameter of the joint sleeve is such that no additional supports are necessary to prevent sagging in the spliced cable and the gradual taper at the ends of the sleeve permit the cables to freely slide longitudinally into the main pipe without any damage thereto.

Referring now to FIGS. 5-8, an alternative embodiment of the present invention is shown to include a tapered cage 30 comprising a series of metal strips 32 welded at one end 34 to a flange 36 which, in turn, is bolted to the end flange 38 to which a conventional outer joint casing 12 may be welded.

The cage 30 is formed with an increasing diameter in the direction away from the flange 36. Accordingly, the strips are separated to permit free fluid flow from the cables to the outer casing, thus improving heat dissipation from the splices. A small spacer 15 may be placed between the conductors to further improve the heat dissipation from the interstices of the conductors. This spacer may also be included in the embodiment shown in FIG. 3.

Figure 6:
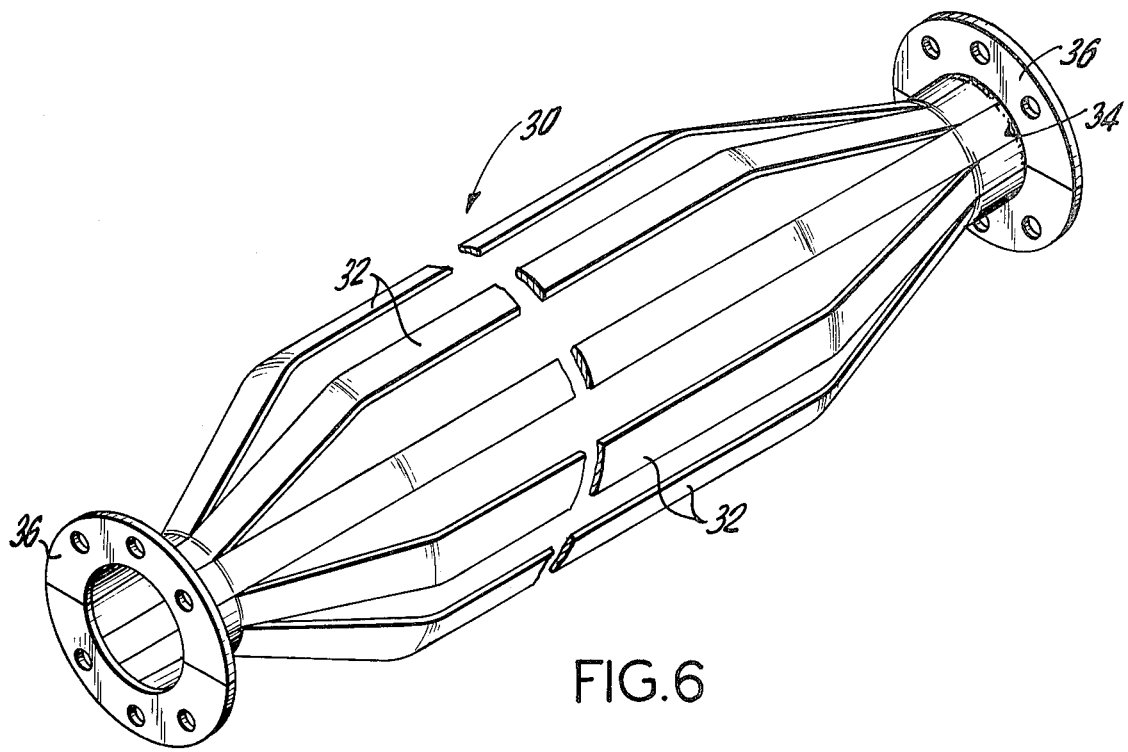
FIG. 6 is a perspective view of a support cage which is incorporated in the embodiment of FIG. 5.
Figure 7:
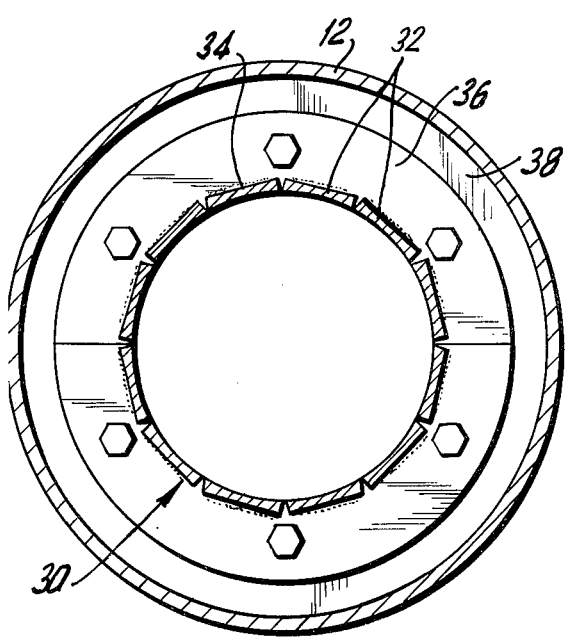
FIG. 7 is a radial cross-sectional view of the embodiment shown in FIG. 5 taken along line 7—7.
Figure 8:
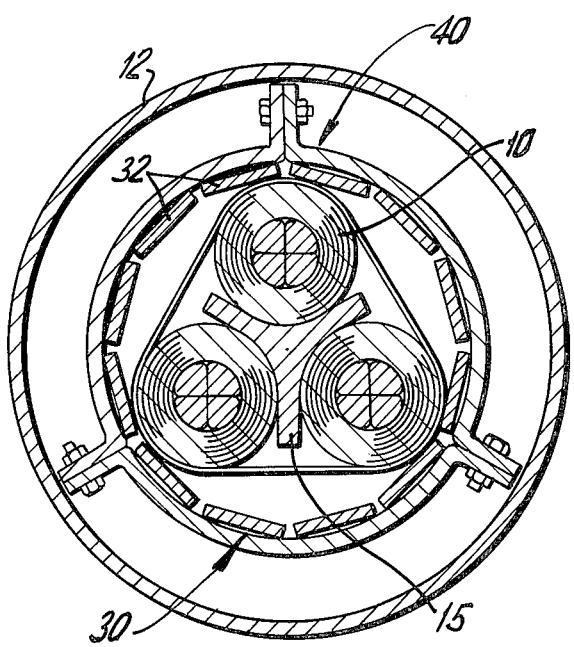
FIG. 8 is a radial cross-sectional view of the embodiment of FIG. 5 taken along line 8—8.

The cage 30 may be made in two radial halves to permit assembly of the cage after the splice is made (see FIG. 6). The cage arrangement has the advantage that it need not be an exact longitudinal fit as no fluid tight gaskets are required and since a slight amount of longitudinal adjustment is possible due to the bowing action of the strips. If the splice is an exceptionally long one, it may be desirable to place a support 40 between the outside of the cage and the inner surface of the casing 12 intermediate the ends of the casing. There will, however, be no longitudinal movement of this support 40 and it does not come into contact with the splice or cable so as to cause the aforementioned prior art problems. This cage and supports may be of non-metallic material such as molded plastic.

It can thus be seen that a joint casing arrangement is herein provided which obviates the need for limiting the length of a splice and which permits relatively free movement of the splice longitudinally of the casing due to temperature changes of the cable conductor. If the cable is on a grade, the cage and casing of an arrangement according to the present invention may be lengthened on the down hill side so as to permit even greater movement in that direction if the cable tends to slide down hill. There is no limit to the amount of movement which can be accommodated with an arrangement according to the present invention.

While what has been shown and described herein comprise preferred embodiments of the invention it is, of course, to be understood that various modifications and changes may be made without departing from the invention. For example, a perforated, tapered pipe may be used as an equivalent for the cage 30.

It is therefore intended to cover in the following claims all devices as may fall within the true spirit and scope of the present invention.

What I claim is:

1. In combination, an electrical cable splice support including an outer casing and an inner cage member generally coaxially disposed within said outer casing and comprising a generally cylindrical member tapered toward the axial ends thereof, said outer casing being at least partially filled with a fluid coolant and said cage being formed with openings for directing the free flow of the fluid coolant throughout the space defined by said casing.

2. A combination according to claim 1, wherein said cage member comprises a series of longitudinal strips, each said strip being outwardly bowed along the length thereof to define elongated openings therebetween for passing said coolant.

3. A combination according to claim 2, wherein said cage member is separated along a generally radially extending plane to form two parts and is provided with radially extending flanges at the terminal ends thereof.

* * * * *